United States Patent [19]

Harris et al.

[11] Patent Number: 5,584,070

[45] Date of Patent: Dec. 10, 1996

[54] WIRELESS PAGER WITH SEPARABLE RECEIVER UNIT AND TRANSMITTER UNIT

[75] Inventors: Daryl R. Harris, Evanston; Shrirang N. Jambhekar; William L. Reber, both of Schaumburg; Bruce E. Stuckman, Algonquin, all of Ill.; Cary D. Perttunen, Shelby Township, Mich.

[73] Assignee: Motorola, Inc., Schaumburg, Ill.

[21] Appl. No.: 366,157

[22] Filed: Dec. 29, 1994

[51] Int. Cl.$^6$ .......................... H04N 5/30; H04N 5/225; G03B 13/10; H04Q 7/00

[52] U.S. Cl. .................. 455/346; 340/825.44; 348/207; 348/375; 348/552; 455/38.4; 455/348; 396/429; 396/544

[58] Field of Search ................................ 455/38.4, 34.4, 455/34.64, 348, 349, 228; 340/825.44; 348/333, 207, 552, 373, 375; 354/75, 76, 295

[56] References Cited

U.S. PATENT DOCUMENTS

| | | | |
|---|---|---|---|
| 4,473,824 | 9/1984 | Claytor | 455/38.4 |
| 4,578,739 | 3/1986 | McKee et al. | 361/395 |
| 4,704,740 | 11/1987 | McKee et al. | 455/348 |
| 4,814,876 | 3/1989 | Horio | 348/333 |
| 4,837,817 | 6/1989 | Maemori | 348/333 |
| 4,856,088 | 8/1989 | Oliwa et al. | 455/349 |
| 5,122,880 | 6/1992 | Nagano | 348/333 |
| 5,138,312 | 8/1992 | Tsukamoto | 340/825.44 |
| 5,164,833 | 11/1992 | Aoki | 348/333 |
| 5,220,366 | 6/1993 | King | 354/76 |
| 5,381,179 | 1/1995 | Kashimura | 348/333 |

*Primary Examiner*—Leslie Pascal
*Attorney, Agent, or Firm*—Bruce E. Stuckman; Jeffrey G. Toler

[57] ABSTRACT

A receiver receives at least one message containing a visual message. A display device, in communication with the receiver, displays the visual message of a selected one of the at least one message. A first housing houses the receiver and the display device to form a self-contained, viable receiver unit. A camera captures at least one image. A transmitter transmits a signal based upon the at least one image captured by the camera. A second housing houses the camera and the transmitter to from a self-contained, viable transmitter unit. The second housing is selectively attachable and detachable from the first housing. As a result, the transmitter unit may be selectively attached to the receiver unit and detached from the receiver unit.

19 Claims, 2 Drawing Sheets

WIRELESS PAGER WITH SEPARABLE RECEIVER UNIT AND TRANSMITTER UNIT

TECHNICAL FIELD

The present invention relates to a selective call receiver, such as a wireless pager, capable of providing a visual display based upon a received signal.

BACKGROUND OF THE INVENTION

The use of selective call receivers, such as wireless pagers, is becoming increasingly popular in both personal and business applications. Many currently-available commercial pagers produce either an audio signal or a vibration signal to alert a user of an incoming message. In addition to an alerting signal, many pagers are capable of receiving radio frequency signals representative of a numerical message. These pagers further include a display device capable of displaying the numerical message. This allows a party paging the user to send a return telephone number, for example, directly to the wireless pager.

Other commercially-available pagers are capable of receiving radio frequency signals representative of an alphanumerical message, and displaying the alphanumerical message on a display device. This allows a party paging the user to send a brief text-based message directly to the wireless pager.

In addition to displaying a received message, it is desirable for the wireless pager to be further capable of creating a paging message for reception by another wireless pager. This allows the user to reply to te received message, for example, using only the wireless pager. As a result, it is not required for the user to reply via a telephone.

In order to maintain the portability of the wireless pager capable of creating the paging message, it is desirable to utilize removable elements within the pager. U.S. Pat. No. 4,856,088 to Oliwa et al. discloses a removable display module for use with a portable radio transceiver. The transceiver is contained within an enclosure having a recess for housing the display module. Means for removably attaching the display module to the radio transceiver is included.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

Embodiments of a wireless pager in accordance with the present invention advantageously include a detachable transmitter unit which cooperates with a viable, self-contained receiver unit. When the transmitter unit and the receiver unit are attached, the wireless pager is capable of forming and transmitting a visual message for reception by another wireless pager. When detached from the transmitter unit, the receiver unit remains capable of receiving and displaying a visual paging message. As a result, the portability of the wireless pager in a receive-only application is not sacrificed. The wireless pager may be advantageously utilized in various applications such as visual paging and visual mail.

Figure 1:
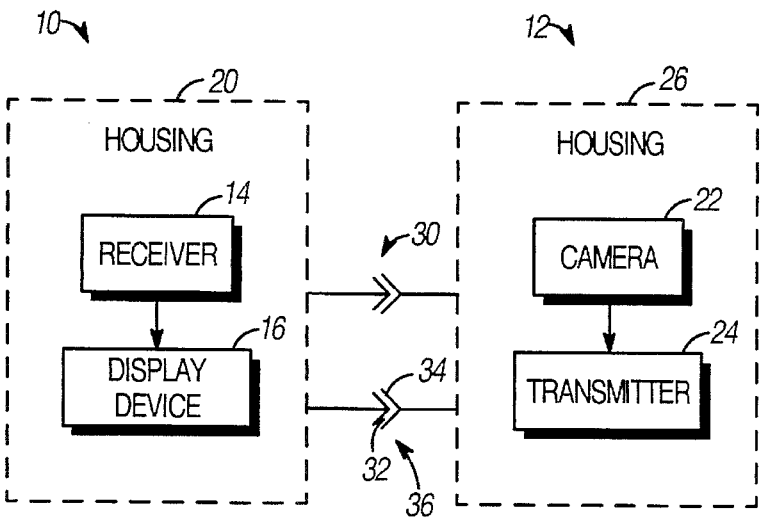
FIG. 1 is a block diagram of an embodiment of a wireless pager having a receiver unit and a transmitter unit which are separable.

FIG. 1 is a block diagram of an embodiment of a wireless pager having a receiver unit 10 and a transmitter unit 12 which are separable. The receiver unit 10 contains a receiver 14 which receives at least one message containing a visual message. The visual message may be in the form of a numeric message, an alphanumeric message, an image, or a combination thereof.

The receiver 14 receives the at least one message in the form of a radio frequency signal. The radio frequency signal may be transmitted, for example, by a paging service provider using a ground antenna or a satellite. As one having ordinary skill in the art will recognize, the radio frequency signal typically contains an identification signal which identifies which wireless pager is to receive the message. Hence, the receiver unit 10 typically includes hardware responsive to the identification signal for detecting messages which are to be displayed thereby.

Typically, the radio frequency signal is modulated in dependence upon the at least one message. As such, the receiver 14 typically includes a demodulator (not specifically illustrated), as is known in the art. The demodulator acts to extract, from the radio frequency signal, a demodulated signal representative of each of the at least one message. The demodulator extracts the demodulated signal based upon a predetermined modulation scheme which is utilized.

In particular, the demodulator extracts a visual message signal representative of the visual message contained in the at least one message. The visual message signal may be in the form of either an analog signal or a digital signal. If the visual message contains either a numeric message or an alphanumeric message, the visual message signal preferably includes a coded representation designating one or more characters which form the visual message. If the visual message contains an image, the visual message signal may be either an analog signal or a digital signal representative of pixels which form the image. Alternatively, the visual message signal includes a designator of a selected image from a plurality of predetermined images.

The receiver unit 10 further contains a display device 16 in communication with the receiver 14. The display device 16 displays the visual message of a selected one of the at least one message. The display device 16 preferably comprises a liquid crystal display (LCD) having a pixel resolution sufficient for displaying the visual message. Alternatively, other display devices may be employed as one with ordinary skill in the art will recognize.

For displaying either a numeric message or an alphanumeric message, the display device 16 may employ a standard liquid crystal character display such as those used in commercial wireless pagers. For displaying an image, the display device 16 preferably employs a LCD having a sufficient pixel resolution so that the image may be recognized by a recipient of the visual message. Further for displaying the image, the LCD is preferably capable of producing a color display or a monochrome display with a sufficient number of pixel intensity levels and/or pixel colors so that the image may be recognized. The pixel resolution, pixel intensity levels, and pixel colors are of importance when the image is of an individual sending the message.

A housing 20 physically houses the receiver 14 and the display device 16 so that the receiver unit 10 is self-contained. The display device 16 is housed by the housing 20 in a manner which allows a user to view the visual message displayed thereby. The receiver unit 10, therefore, is viable for receiving the at least one message and displaying the visual message contained therein.

The transmitter unit 12 contains a camera 22 which captures at least one image. The at least one image may comprise, for example, a single still image used in forming a visual message. Alternatively, the at least one image may comprise a sequence of images which, when viewed in succession, provide an animated display for the visual message. The camera 22 may be embodied by one of various devices known in the art; these devices include, but are not limited to: a charge-coupled device (CCD) array, or a vidicon.

The camera 22 produces either an analog or a digital image signal representative of pixels which form the at least one image. In order to produce the digital image signal, the camera 22 may include a digitizer (not specifically illustrated). By utilizing the digital image signal, further image processing hardware, such as an encoder (not specifically illustrated) and/or an image compressor (not specifically illustrated), may be included in the camera 22 to reduce the number of bits required to represent the at least one image. For a sequence of images, various inter-frame compression techniques known in the art of image processing may be employed in the image compressor.

The transmitter unit 12 further contains a transmitter 24 which transmits a signal based upon the at least one image captured by the camera 22. The transmitter 24 may include a modulator (not specifically illustrated) which produces the signal modulated in dependence upon the image signal representation of the at least one image produced by the camera 22. Various modulation techniques may be employed, as one with ordinary skill in the art of communications will recognize. Examples of such modulation techniques include, but are not limited to: amplitude modulation, frequency modulation, phase modulation, pulse amplitude modulation, pulse code modulation, pulse width modulation, pulse position modulation, pulse width modulation, time-division modulation, and frequency division modulation.

The signal may be transmitted to a centrally-located paging computer via a standard telephone connection (either wireless or landline). Upon receiving the signal, the paging computer transmits a radio frequency paging signal, which contains the at least one image, to a second wireless pager. As a result, the visual message formed using the camera 22 is transmitted to the second wireless pager.

Alternatively, the signal transmitted by the transmitter 24 may already be a radio frequency signal. Here, the transmitter 24 further includes an antenna (not specifically illustrated) for radiating the radio frequency signal. The radio frequency signal may be transmitted directly to the second wireless pager, or alternatively, may be indirectly transmitted to the second wireless pager via an intermediate location, such as a paging service provider or a repeater. Generally, the intermediate location is one which receives the radio frequency signal and transmits a radio frequency paging signal based thereupon to the second wireless pager.

A housing 26 physically houses the camera 22 and the transmitter 24 so that the transmitter unit 12 is self-contained. The housing 26 is selectively attachable and detachable from the housing 20, as indicated schematically by a mechanical connection 30. As a result, the transmitter unit 12 may be either physically attached to the receiver unit 10 or physically detached from the receiver unit 10.

Optionally, the housing 20 includes at least one electrical contact 32 which mates with at least one mating contact 34 included in the housing 26. The at least one electrical contact 32 and the at least one mating contact 34 provide an electrical coupling 36 between the housing 20 and the housing 26, and hence between the receiver unit 10 and the transmitter unit 12, when the units 10 and 12 are physically attached. The electrical coupling 36 may be used to interconnect circuits contained within the units 10 and 12. The electrical coupling 36 may also be used to provide current from one of the units 10 and 12 to power another of the units 10 and 12.

Figure 2:
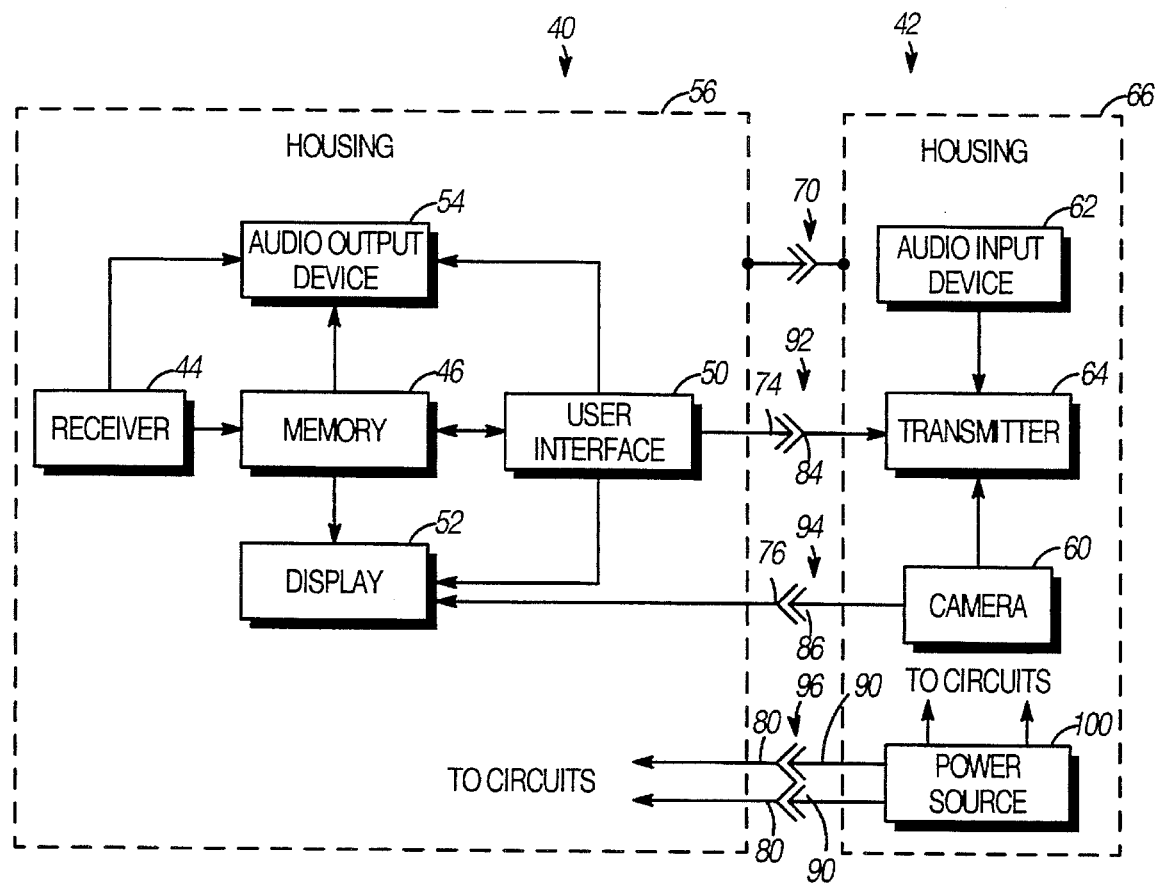
FIG. 2 is a block diagram of another embodiment of a wireless pager having a receiver unit and a transmitter unit which are separable.

FIG. 2 is a block diagram of another embodiment of a wireless pager having a receiver unit 40 and a transmitter unit 42 which are separable. The receiver unit 40 includes a receiver 44, as described in the embodiment of FIG. 1, which receives at least one message containing a visual message. Optionally, the at least one message further contains an audio message representative of either an audio alert message or a spoken message.

The receiver unit 40 includes a memory 46 in communication with the receiver 44. The memory 46 stores, in an electronic form, the at least one message received by the receiver 44. The memory 46 can comprise, for example, either a static or a dynamic random-access memory (RAM) device, or a nonvolatile programmable memory device such as an EEPROM.

The receiver unit 40 further includes a user interface 50 which is used for selecting a selected one message of the at least one message. Generally, the user interface 50 includes an input device such as one or more buttons, a keyboard, a mouse, a joystick, a lightpen, a trackball, a touchpad, or a touchscreen, to name a few. In a preferred embodiment, the user interface 50 includes an array of buttons on a touchscreen which allows an individual to select the selected one message by performing a series of keystrokes. In another preferred embodiment, the individual steps through the at least one message, by pressing an increment button and/or a decrement button contained in the user interface 50, to select the selected one message.

A display device 52, as described in the embodiment of FIG. 1, is included in the receiver unit 40. The display device 52 communicates with the memory 46 and the user interface 50 to display the visual message of the selected one message of the at least one message.

The receiver unit 40 optionally includes an audio output device 54 capable of producing at least one acoustic pressure wave is response to an electrical signal applied thereto. The receiver 44 communicates with the audio output device 54 such that at least one acoustic pressure wave representative of an audio alert message is produced upon receiving a new message. Further, the audio output device 54 communicates with the memory 46 and the user interface 50 to produce at least one acoustic pressure wave representative of the audio message contained in the selected one message. Preferably, the display device 52 and the audio output device 54 cooperate to synchronize the visual message and the audio message contained in the selected one message. For example, a sequence of images may be successively displayed to correspond with a spoken audio message. As one having ordinary skill in the art will recognize, the audio output device 54 may include a speaker or any like audio output transducer.

A housing 56 houses the receiver 44, the memory 46, the user interface 50, the display device 52, and the audio output device 54. As a result, the receiver unit 40 is self-contained. The display device 52 is housed by the housing 56 in a manner which allows the user to view the visual message displayed thereby. Further, the user interface 50 is housed in a manner which allows the user access thereto. The receiver unit 40, therefore, is viable for receiving the at least one message and displaying the selected one message.

The transmitter unit 42 contains a camera 60, as described in the embodiment of FIG. 1, which captures at least one image for forming a visual message. Optionally, the transmitter unit 42 further contains an audio input device 62 which receives at least one acoustic pressure wave for forming an audio message. The audio input device 62 may include a microphone or a like transducer capable of producing an electrical signal representative of the at least one acoustic pressure wave received thereby.

Typically, the audio message includes a spoken message articulated by the user. The spoken message may be articulated contemporaneously with the capturing of a sequence of images of the user, so that a resulting visual message can be synchronized therewith at a receiving pager. Alternatively, the spoken message may be articulated at a different time than that for capturing the at least one image. Regardless, by employing both the camera 60 and the audio input device 62, the user is capable of forming a message which comprises both an audio message and a visual message.

The transmitter unit 42 further includes a transmitter 64, as described in the embodiment of FIG. 1, which communicates with the camera 60 and the audio input device 62. The transmitter 64 transmits a signal based upon the at least one image captured by the camera 60 and the at least one acoustic pressure wave received by the audio input device 62. Hence, the transmitter 64 transmits a message containing the visual message and the audio message.

A housing 66 physically houses the camera 60, the audio input device 62, and the transmitter 64 so that the transmitter unit 42 is self-contained. The housing 66 is selectively attachable and detachable from the housing 56 as indicated schematically by a mechanical connection 70. As a result, the transmitter unit 42 may be either physically attached to the receiver unit 40 or physically detached from the receiver unit 40. In a preferred embodiment, the transmitter unit 42 acts as an accessory shell which physically receives the receiver unit 40. Means for securing the receiver unit 40 to the transmitter unit 42, such as a magnetic mounting apparatus, may further be included.

The receiver unit 40 includes a plurality of electrical contacts which includes a first electrical contact 74, a second electrical contact 76, and a pair of electrical contacts 80. Similarly, the transmitter unit 42 includes a plurality of mating contacts which includes a first mating contact 84, a second mating contact 86, and a pair of mating contacts 90. When the first housing 56 is attached to the second housing 66, the plurality of electrical contacts 72 mate with the plurality of mating contacts 82 to provide a plurality of electrical couplings.

The user interface 50 communicates with the transmitter 64 via a first 92 of the plurality of electrical couplings. As a result, the user interface 50 may be used to control the transmission of messages formed using the wireless pager. Further, the user interface 50 may be used to enter an alphanumeric message which is transmitted by the transmitter 64.

The display device 52 displays the at least one image captured by the camera 60, with the at least one image being communicated via a second 94 of the plurality of electrical couplings. As a result, the user may preview a visual message formed using the wireless pager before the visual message is transmitted.

A pair 96 of the plurality of electrical couplings are used to provide current to power circuits within the receiver unit 40. The current is provided by a power source 100 located within the transmitter unit 42. In particular, the receiver 44, the memory 46, the user interface 50, the display device 52, and/or the audio output device 54 may be powered by current provided by the pair 96 of the plurality of electrical couplings. As a result, the power source 100 acts as an auxiliary power source for the receiver unit 40 when the units 40 and 42 are attached. In a preferred embodiment, power source 100 is a battery such as a standard Nickel-Hydride, Nickel Cadmium or Alkaline battery pack. However, a solar cell, used either alone or with a battery, could further be used to implement power source 100.

Figure 3:
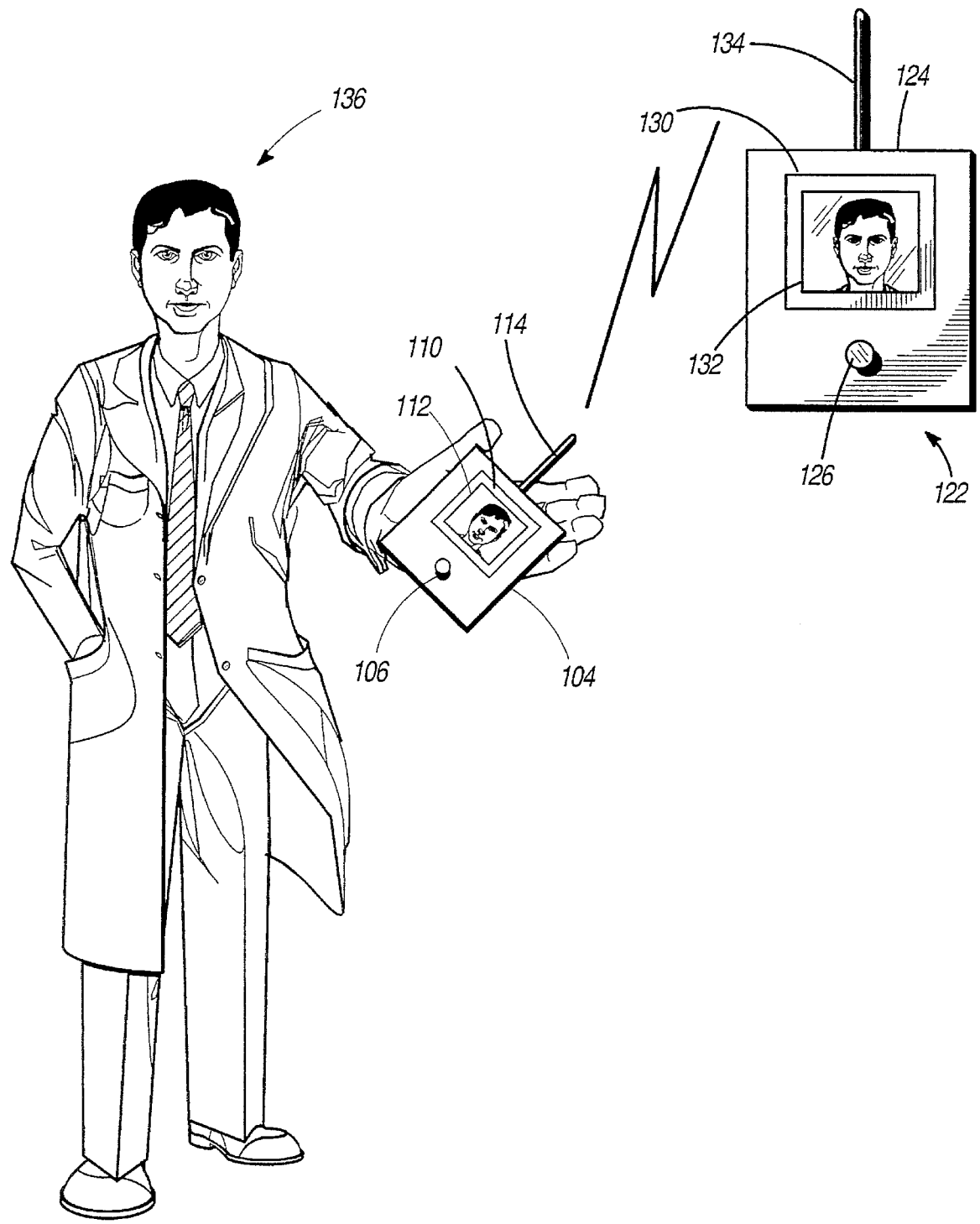
FIG. 3 is an environmental view of an embodiment of a wireless pager in accordance with the present invention.

FIG. 3 is an environmental view of an embodiment of a wireless pager 102 in accordance with the present invention. The wireless pager 102 includes a transmitter unit 104 having a camera 106, a receiver unit 110 having a display device 112, and an external antenna 114. The transmitter unit 104 acts as an accessory shell for physically receiving the receiver unit 110. Similarly, a second wireless pager 122 includes a transmitter unit 124 having a camera 126, a receiver unit 130 having a display device 132, and an external antenna 134. The display device 112 and the display device 132 each include a corresponding touchscreen (not specifically illustrated) for use in a corresponding user interface.

Suppose a user 136 desires to send a visual message to another user (not shown) of the second wireless pager 122. The user 136 commands the wireless pager 102 to capture an image of himself/herself by touching a predetermined region of the touchscreen included on the display device 112. In addition, the user 136 may articulate a spoken message for reception by an audio input device (not specifically illustrated) within the transmitter unit 104. By touching another predetermined region of the touchscreen, the user 136 may preview the visual message on the display device 112. Based upon the preview, the user 136 may wish another attempt at forming the visual message; this is also accomplished using the touchscreen. In response to another command given via the touchscreen, the wireless pager 102 transmits the visual message and the optional spoken message.

A paging message containing the visual message and the spoken message is received by the second wireless pager 122. Upon receiving the paging message, the second wireless pager 122 produces an audio alert signal indicating that the paging message has arrived. The visual message may be displayed on the display device 132 automatically, or by a selection given using the touchscreen on the display device 132. Further, the optional spoken message may be reproduced by an audio output device (not specifically illustrated) within the receiver unit 130. Advantageously, the above-mentioned paging message is received by the receiver unit 130 and displayed on the display device 132 even when the receiver unit 130 is detached from the transmitter unit 124.

Thus, there has been described herein a concept, as well as several embodiments including a preferred embodiment of a wireless pager having a receiver unit and a transmitter unit which are separable.

Because the various embodiments of the wireless pager as herein-described utilize a detachable transmitter unit which cooperates with a viable, self-contained receiver unit, they provide a significant improvement in that the portability of the wireless pager in a receive-only application is not sacrificed in order to provide a capability of message transmission.

Additionally, the various embodiments of the present invention as herein-described use at least one electrical contact and at least one mating contact to allow the transmitter unit to utilize existing circuitry within the receiver unit when the units are attached. Further, the various embodiments of the present invention as herein-described allow the transmitter unit to provide an auxiliary source of power to the receiver unit when the units are attached.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

We claim:

1. A wireless pager comprising:
   a receiver which receives at least one message containing a visual message;
   a display device in communication with the receiver, the display device displaying the visual message of a selected one of the at least one message;
   a first housing which houses the receiver and the display device;
   a camera which captures at least one image;
   a transmitter which transmits a first signal based upon the at least one image captured by the camera; and
   a second housing which houses the camera and the transmitter, wherein the second housing is selectively attachable and detachable from the first housing;
   wherein the first housing includes at least one electrical contact and the second housing includes at least one mating contact, wherein the at least one electrical contact and the at least one mating contact provide an electrical coupling between the first housing and the second housing when the first housing is attached to the second housing and wherein the receiver and the display device are powered by current provided via the electrical coupling.

2. The wireless pager of claim 1 further comprising an audio input device which receives at least one acoustic pressure wave, wherein the transmitter transmits a second signal based upon the at least one acoustic pressure wave received by the audio input device.

3. The wireless pager of claim 2 wherein the audio input device is housed by the second housing.

4. The wireless pager of claim 1 further comprising an audio output device responsive to the receiver, wherein the at least one message received by the receiver further contains an audio message, and wherein the audio output device produces at least one acoustic pressure wave representative of the audio message.

5. The wireless pager of claim 4 wherein the audio output device is housed by the first housing.

6. The wireless pager of claim 1 wherein the camera and the display device communicate via the electrical coupling, wherein the display device displays the at least one image captured by the camera.

7. The wireless pager of claim 1 further comprising a user interface for selecting the selected one of the at least one image, the user interface housed by the first housing.

8. The wireless pager of claim 7 wherein the first housing includes at least one electrical contact and the second housing includes at least one mating contact, wherein the at least one electrical contact and the at least one mating contact provide an electrical coupling between the user interface and the transmitter when the first housing is attached to the second housing.

9. The wireless pager of claim 1 further comprising a memory which stores the at least one message received by the receiver, the memory providing the visual message of the selected one of the at least one image to the display device.

10. A wireless pager comprising:
    a receiver which receives at least one message containing a visual message and an audio message;
    a memory which stores the at least one message received by the receiver;
    a user interface for selecting one of the at least one message;
    a display device in communication with the memory and the user interface, the display device displaying the visual message of the one of the at least one message;
    an audio output device in communication with the user interface and the memory, the audio output device producing at least one acoustic pressure wave representative of the audio message of the one of the at least one message;
    a first housing which houses the receiver, the memory, the user interface, the display device, and the audio output device, the first housing having at least one electrical contact;
    a camera which captures at least one image;
    an audio input device which receives at least one acoustic pressure wave;
    a transmitter which transmits a signal based upon the at least one image captured by the camera and the at least one acoustic pressure wave received by the audio input device; and
    a second housing which houses the camera, the audio input device, and the transmitter, the second housing having at least one mating contact, wherein the second housing is selectively attachable and detachable from the first housing, and wherein the at least one electrical contact and the at least one mating contact provide an electrical coupling between the first housing and the second housing when the first housing is attached to the second housing.

11. The wireless pager of claim 10 wherein the receiver and the display device are powered by current provided via the electrical coupling.

12. The wireless pager of claim 10 wherein the user interface communicates with the transmitter via the electrical coupling.

13. The wireless pager of claim 10 wherein the camera and the display device communicate via the electrical coupling, wherein the display device displays the at least one image captured by the camera.

14. A wireless pager comprising:
    a receiver which receives at least one message containing a visual message and an audio message;
    a memory which stores the at least one message received by the receiver;
    a user interface for selecting one of the at least one message;
    a display device in communication with the memory and the user interface, the display device displaying the visual message of the one of the at least one message;

an audio output device in communication with the user interface and the memory, the audio output device producing at least one acoustic pressure wave representative of the audio message of the one of the at least one message;

a first housing which houses the receiver, the memory, the user interface, the display device, and the audio output device, the first housing having a plurality of electrical contacts;

a camera which captures at least one image;

an audio input device which receives at least one acoustic pressure wave;

a transmitter which transmits a signal based upon the at least one image captured by the camera and the at least one acoustic pressure wave received by the audio input device; and a second housing which houses the camera, the audio input device, and the transmitter, the second housing having a plurality of mating contacts, wherein the second housing is selectively attachable and detachable from the first housing;

wherein the plurality of electrical contacts and the plurality of mating contacts provide a plurality of electrical couplings between the first housing and the second housing when the first housing is attached to the second housing, wherein the user interface communicates with the transmitter via a first of the plurality of electrical couplings, wherein the display device displays the at least one image captured by the camera and communicated via a second of the plurality of electrical couplings, and wherein the receiver and the display device are powered by current provided via a pair of the plurality of electrical couplings.

15. A wireless pager comprising:

a receiver which receives at least one message containing a visual message;

a display device in communication with the receiver, the display device displaying the visual message of a selected one of the at least one message;

a first housing which houses the receiver and the display device;

a camera which captures at least one image;

a transmitter which transmits a first signal based upon the at least one image captured by the camera; and a second housing which houses the camera and the transmitter, wherein the second housing is selectively attachable and detachable from the first housing and wherein, when the second housing and the first housing are attached, the wireless pager is capable of transmitting the first signal to another wireless pager.

16. The wireless pager of claim 15 wherein the camera and the display device communicate via the electrical coupling, wherein the display device displays the at least one image captured by the camera.

17. The wireless pager of claim 15 further comprising a user interface for selecting the selected one of the at least one image, the user interface housed by the first housing.

18. The wireless pager of claim 15 further comprising a memory which stores the at least one message received by the receiver, the memory providing the visual message of the selected one of the at least one image to the display device.

19. The wireless page of claim 15 wherein the wireless pager is capable of transmitting the first signal via a wireless link.

* * * * *